No. 864,833. PATENTED SEPT. 3, 1907.
F. J. CREQUE.
SLICING BOARD.
APPLICATION FILED DEC. 29, 1906.
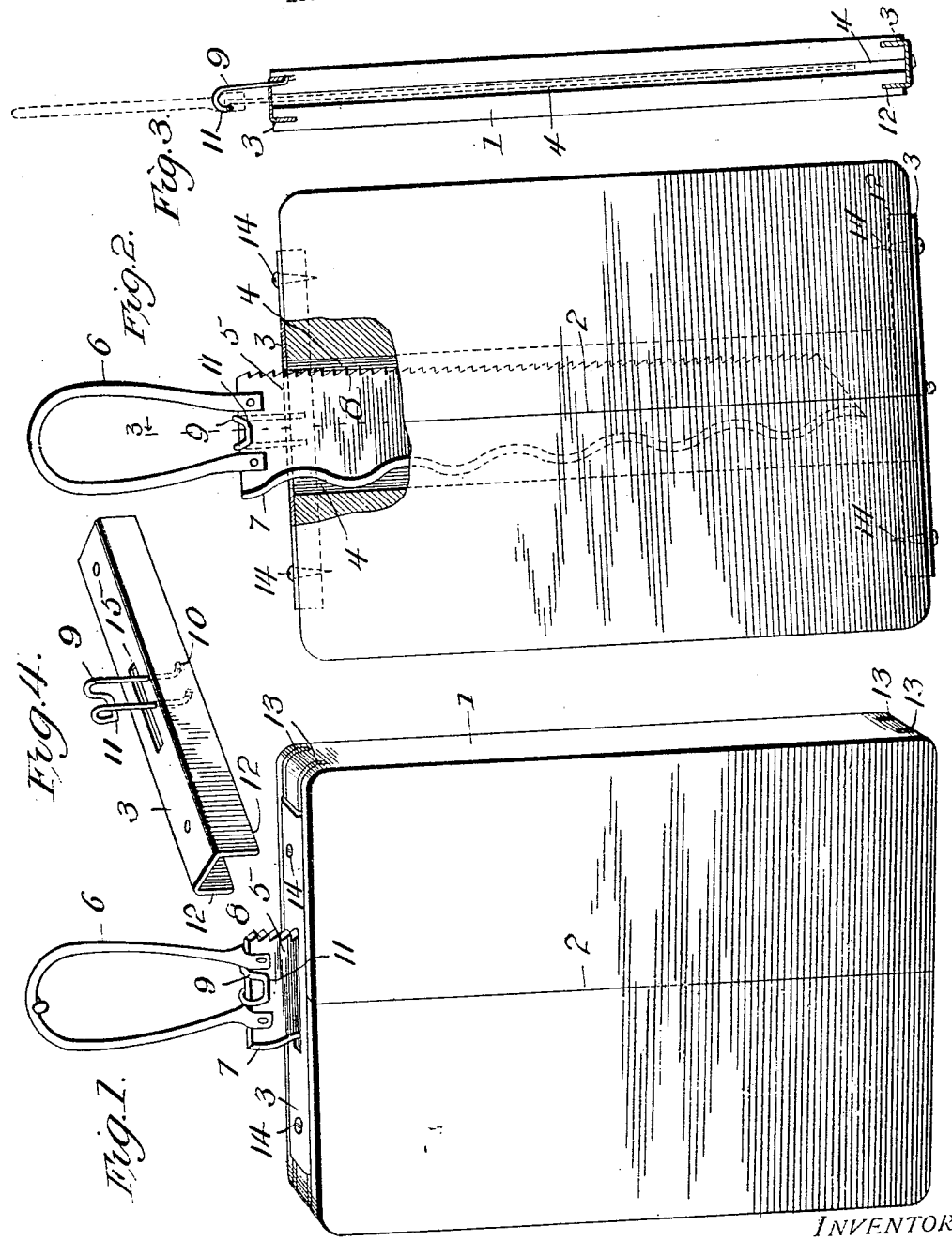
WITNESSES:
INVENTOR
Frank J. Creque
BY E. B. Stocking
Attorney

UNITED STATES PATENT OFFICE.

FRANK J. CREQUE, OF CUYAHOGA FALLS, OHIO.

SLICING-BOARD.

No. 864,833.      Specification of Letters Patent.      Patented Sept. 3, 1907.

Application filed December 29, 1906. Serial No. 350,069.

*To all whom it may concern:*

Be it known that I, FRANK J. CREQUE, a citizen of the United States, residing at Cuyahoga Falls, in the county of Summit, State of Ohio, have invented certain new and useful Improvements in Slicing-Boards, of which the following is a specification, reference being had therein to the accompanying drawing.

This invention relates to certain new and useful improvements in slicing boards.

The invention has for an object to provide a simple and inexpensive device of this character having a slot or recess formed therein for the purpose of receiving and shielding the blade of the knife or other cutting implement to be used with the board, having a projecting portion of the knife for suspension of the board.

A further object is to provide a novel arrangement of hook for retaining the knife in said recess in such a manner as to permit the handle thereof to be utilized as a suspending means whereby the board may be hung upon a nail, hook or the like.

Other and further objects and advantages of the invention will be hereinafter set forth and the novel features thereof defined by the appended claims.

In the drawing:—Figure 1 is a perspective of the invention; Fig. 2 is a front view with parts broken away showing the cutting implement disposed in its shielding recess; Fig. 3 is a section on the line 3—3, Fig. 2, and Fig. 4 is a perspective of the device for uniting the sections of the board.

Like numerals refer to like parts in the several views of the drawing.

Referring to the drawing, the numeral 1 designates the body of the board, which may be of any desired construction, but is preferably formed in two sections joined at 2. Each of these sections before they are secured together by means of the connecting plate 3 have the slots 4 formed therein, which, when the parts are assembled, form a recess designed to receive the blade 5 of the knife or other cutting implement to be used with the board.

Any desired form of knife or cutting implement may be used with the board, but that herein shown is a combination bread and meat knife, the blade 5 of which has the handle 6 secured thereto, said blade being formed with the bread cutting edge 7 and saw cutting edge 8.

For the purpose of retaining the knife in the recess a hook 9 formed of any suitable material, preferably spring wire, is attached to the connecting plate 3 by means of the rivets 10 or other attaching means. This hook is secured to the plate in such a position that the lip 11 thereof is disposed above and in alinement with the recess in the board and by reason of the resiliency of the material from which it is formed may be sprung over the end of the blade 5 of the cutting implement whereby the same may be retained in the recess in such manner that the handle 6 may be used as a suspending means for hanging the board upon a nail, hook or the like, as shown in Fig. 1.

Any desired means may be employed for securing the sections of the board together, but a preferred form thereof is shown in Fig. 4, and consists of the connecting plate 3, in this instance comprising a channel iron, the angular portions 12 of which are seated in the kerfs 13 formed in the ends of the board sections, said plate being secured to the ends of the sections in any suitable manner, for instance by screws 14, and in such position that the slot 15 therein will register with the recess in the board.

In the use of the invention it will be seen that after the slicing operation it is only necessary to slip the blade of the knife into the recess and spring the hook over the upper end of the blade thereof whereupon the board and knife are connected together and may be hung upon a nail, the handle of the knife being utilized as a suspending hook for that purpose. It will also be observed that the recess in the board not only provides a very convenient storage place for the knife while not in use, but also serves as a shield to prevent the knife from injury, and to obviate all danger of injury to persons handling the board. It will therefore be seen that the invention provides a very simple, economical and efficient utensil for use in the kitchen by means of which the slicing board and knife may always be kept together ready for immediate use.

Having now described my invention and set forth its merits, what I claim and desire to secure by Letters Patent is:—

1. A slicing board provided with a recess therein to receive a cutting implement having a suspending handle, and a retaining device carried by said board at one end of said recess for retaining the implement therein with its handle projected beyond the board.

2. A slicing board provided with a recess therein, and a hook carried by said board and disposed in alinement with said recess for retaining the blade of a cutting implement therein.

3. A slicing board composed of sections, each section having a slot therein to form a recess when assembled for receiving the cutting implement, a plate for uniting said sections, and means attached to said uniting plate to engage the implement and retain the same in said recess.

4. A slicing board having a recess therein to receive the blade of a cutting implement, a plate secured to the ends of said board, and a hook secured to said plate for retaining said blade in the recess.

5. A slicing board formed in sections and having a recess formed therein to receive the blade of a cutting implement, a plate for uniting said sections and having a slot therein disposed in alinement with the recess in said board, and a hook secured to said plate adjacent said slot and disposed above and in alinement with said recess.

In testimony whereof I affix my signature in presence of two witnesses.

FRANK J. CREQUE.

Witnesses:
WILLIAM T. TAYLOR,
E. F. SAUVAIN.